Figure 1:
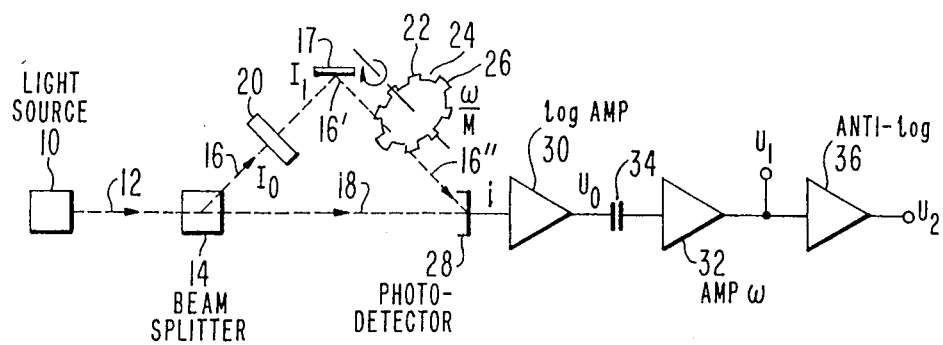

United States Patent [19]

Knop

[11] 4,272,197

[45] Jun. 9, 1981

[54] APPARATUS AND METHOD FOR MEASURING THE RATIO OF TWO SIGNALS

[75] Inventor: Karl Knop, Zurich, Switzerland

[73] Assignee: RCA Corporation, New York, N.Y.

[21] Appl. No.: 70,514

[22] Filed: Aug. 28, 1979

Related U.S. Application Data

[63] Continuation of Ser. No. 866,651, Jan. 3, 1978, abandoned.

[51] Int. Cl.³ .......................................... G01N 21/59
[52] U.S. Cl. .................................... 356/434; 364/850
[58] Field of Search ............... 356/223, 434, 432, 436, 356/441, 442, 218, 408; 364/850

[56] References Cited

U.S. PATENT DOCUMENTS

| 3,455,636 | 7/1969 | Haswell | 356/323 X |
|---|---|---|---|
| 3,497,302 | 2/1970 | Tipotsch | 250/232 X |
| 3,669,547 | 6/1972 | Sell | 356/416 X |
| 3,756,721 | 9/1973 | Williams | 356/329 X |
| 3,787,121 | 1/1974 | Lowy et al. | 250/233 X |
| 3,793,579 | 2/1974 | Cason et al. | 356/316 |
| 3,918,815 | 11/1975 | Gadbois | 356/435 |

FOREIGN PATENT DOCUMENTS

| 1003433 | 9/1965 | United Kingdom | 364/850 |
|---|---|---|---|
| 263289 | of 1970 | U.S.S.R. | 364/850 |

Primary Examiner—John K. Corbin
Assistant Examiner—Bruce Y. Arnold
Attorney, Agent, or Firm—Samuel Cohen; William Squire

[57] ABSTRACT

The ratio of the intensity of two light beams is determined by an apparatus which includes a chopper wheel for chopping one of the light beams, a photodetector for detecting the intensity of both light beams applied simultaneously thereto, and a logarithmic amplifier for amplifying the current produced by the photodetector. The AC component of the logarithmically amplified current represents the ratio of the intensity of the two light beams.

9 Claims, 2 Drawing Figures

APPARATUS AND METHOD FOR MEASURING THE RATIO OF TWO SIGNALS

This is a continuation of application Ser. No. 866,651, filed Jan. 3, 1978, now abandoned.

The present invention relates to an apparatus and method for determining the ratio between two signals and has a particular utility in optical spectroscopy.

Optical transmittance $t_s(\lambda)$ is defined as the ratio between the amount of light of wavelength $\lambda$ transmitted through a sample to the amount of such light of the same wavelength which is incident on the sample. In a typical spectrometer, $t_s(\lambda)$ is measured by comparing the intensity of a light beam passing through the sample with the intensity of a reference from the same source. This two beam technique compensates for intensity variations of the light source (with time, wavelength, temperature etc.) and sensitivity characteristics of the detectors. One of the simplest methods for obtaining a direct transmittance measurement is to amplify logarithmically the two signals from two detectors, subtract one of the amplified signals from the other, and then to apply the difference signal to an anti-logarithm amplifier. The thus applied difference signal is proportional to the transmittance, $t_s(\lambda) = i_S/i_R$ where $i_S$ represents the sample signal and $i_R$ is the reference signal.

The approach above, while relatively simple, is not without its drawbacks. For example, the two channels (light paths, detectors, log-amplifiers) must have substantially identical operating characteristics and it is sometimes difficult to place and to maintain them in this condition. Further, the log-amplifier in the sample channel may easily get out of range for low values of transmittance measurements ($i_S$ small). While techniques are available for alleviating these problems, they are often complicated.

In a method and apparatus embodying the present invention, the ratio of two DC signals is determined by converting one of them to an AC signal, amplifying the sum of both logarithmically, and then detecting the AC component of the amplified sum.

Figure 2:
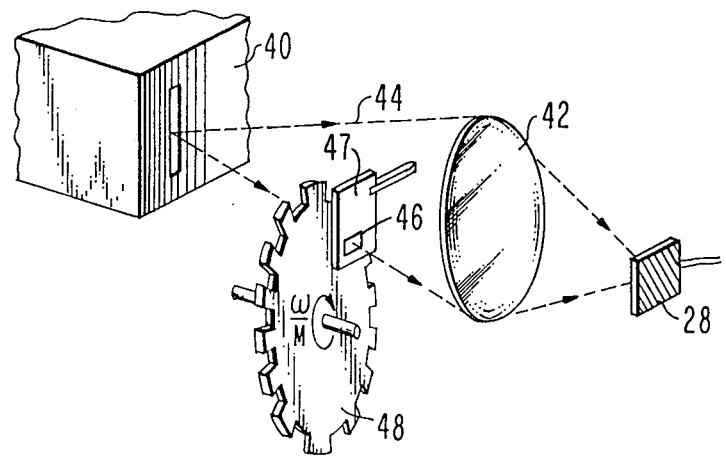

In the drawing:

FIG. 1 is a schematic diagram of an optical spectrometer embodying the present invention; and FIG. 2 is a perspective showing details of the light path between the light source and the photodetector of the system of FIG. 1.

In FIG. 1 source 10 generates a light beam 12 which is split by beam splitter 14 into beams 16 and 18. Other means for providing beams 16 and 18 are shown later in connection with FIG. 2. The source 10 may be one for producing monochromatic light; however, other alternatives are possible. For example, the source 10 may instead, be a white light source or, in general, a source of electromagnetic energy which need not be limited to the visible spectrum. In the most general case, the split beams 16 and 18 may be currents or other non-visible signals and the system can be considered one for determining the ratio of the intensity of these two signals.

Beam 16 is directed through a sample 20 whose transmittance $t_s(\lambda)$ is to be measured. If the beam 16 of wavelength $\lambda$ and the intensity $I_0$ is incident on sample 20 (for example a sheet of colored glass), a portion ($I_0 - I_1$) of this beam is absorbed and reflected, and the remainder, of intensity $I_1$, is transmitted. The transmittance $t_s(\lambda)$ is defined as the intensity ratio $I_1/I_0$ which is a dimensionless number smaller than 1. Sometimes the transmittance is expressed as a percentage, 100 percent corresponding to the case in which $t_s(\lambda)$ is one, i.e., no light is absorbed.

The output beam 16' passed by sample 20 is of intensity $I_1$ is reflected by mirror 17, and is chopped by chopper 22. Wheel 22 has M equal sized light transmitting apertures 24 and M light opaque segments 26. Wheel 22 is rotated at a constance frequency $\omega/M$. The light beam 16'' passed by wheel 22 varies in intensity as a function of time between the values of zero and $I_1$. This light beam is a square wave signal whose frequency is $\omega$. Beams 16'' and 18 are incident upon photodetector 28.

The output of photodetector 28 is a current i which has a DC component representing the intensity of beam 18 and a superimposed AC current representing the intensity of beam 16''. Current i is applied to a logarithmic amplifier 30 whose output $U_0$ is applied through capacitance 34 to frequency sensitive detector amplifier 32 which is tuned to $\omega$. Capacitance 34 filters out the DC component of the output of the amplifier 30 and applies the remaining AC component to the frequency sensitive detector amplifier 32. Detector amplifier 32 can be realized by a phase sensitive amplifier locked to the chopper frequency $\omega$ or by other means. The output of amplifier 32 is signal $U_1$. The signal $U_1$ may be used directly or, as shown in FIG. 1, may be amplified by anti-logarithm amplifier 36 whose output is signal $U_2$.

Both signals $U_1$ and $U_2$ have an amplitude which represents the ratio of the intensity of the beam 16' to beam 18. If the monochromatic light in beam 12 has an intensity $I(\lambda)$ (for clarity only the wavelength $\lambda$ is included as a possible source of intensity variations), it is split into two beams of intensity $aI(\lambda)$ and $bI(\lambda)$, beams 18 and 16 respectively where a and b are dimensionless parameters, $a < 1, b < 1$ and $a + b \leq 1$ and b/a is a constant. The value of b/a is determined by the particular optics used and represents the relative intensities of the two beams. In this application it is preferred that $a >> b$ for reasons to be discussed later. Beam 16' has transmittance $t_s(\lambda)$. The detector current $i(\lambda, t)$ is proportional to the total light intensity and varies with time t, as indicated in expression 1.

$$i(\lambda, t) \sim aI(\lambda) + bI(\lambda) \, t_s(\lambda) \, S(\omega t) \quad (1)$$

$$\text{where } S(\omega t) = \begin{cases} 1 \text{ for } \sin\omega t \geq 0 \\ 0 \text{ for } \sin\omega t < 0 \end{cases} \text{"Squarewave"}$$

The signal $i(\lambda, t)$ is amplified logarithmically in amplifier 30 to produce an output signal.

$$U_o(\lambda, t) = \begin{cases} \log[aI(\lambda)] & \text{when } S(\omega t) = 0 \\ \log[aI(\lambda) + b \cdot I(\lambda) \, t_s(\lambda)] & \text{when } S(\omega t) = 1 \end{cases} \quad (2)$$

The peak-to-peak amplitude of $U_0$ is given by $$\begin{aligned} \Delta U_0(\lambda) &= \log[aI(\lambda) + bI(\lambda) \, t_s(\lambda)] - \log[aI(\lambda)] \\ &= \log \frac{aI(\lambda) + bI(\lambda) \, t_s(\lambda)}{aI(\lambda)} \\ &= \log[1 + b/a \cdot t_s(\lambda)]. \end{aligned} \quad (3)$$

The capacitance 34 filters out the DC component of the wave $U_0$ (that is, the component $\log aI(\lambda)$ of $U_0$ is removed). The AC component of $U_0$ is amplified by amplifier 32 to produce an output indicative of the peak-to-peak value of this component:

$$U_1 = g \log \left(1 + \frac{b}{a} t_s(\lambda)\right) \tag{4}$$

where g is the gain of amplifier 32.

It is known that log (1+X) can be expanded to $$\log(1 + X) = X - \frac{X^2}{2} + \frac{X^3}{3} - \frac{X^4}{4} + \ldots \tag{5}$$

For small values of X, the first term above is a good approximation, that is, where $-1 < X < 1$ $$\log(1 + X) = X \quad \text{where } X << 1 \tag{6}$$

Applying the above to equation 4, $X = (b/a)t_s(\lambda)$. If the system is arranged to make b/a small, that is, to make $a >> b$, then $X << 1$ and the equation for $U_1$ becomes $$U_1 = g \frac{b}{a} t_s(\lambda) \tag{7}$$

As both g and b/a are constants, $U_1$ is a linear representation of the transmittance $t_s(\lambda)$.

The linearity achieved over the range $0 < t_s < 1$ depends on the ratio b/a and is tabulated below:

| $\frac{b}{a}$ | 0.01 | 0.1 | 0.5 | 1 | (8) |
|---|---|---|---|---|---|
| max. error % of full scale | 0.12 | 1.27 | 4.3 | 9 | % |

If the chopped beam 16" is not a squarewave ($S(\omega t)$), mathematical analysis becomes more difficult. Computational studies, however, show that the given formulae still remain applicable with high accuracy.

If desired, full linearity for any beam intensity ratio b/a can be obtained by an additional stage, e.g., an anti-log amplifier 36. The resulting voltage $U_2$ with its gain suitably adjusted is then given by $$U_2 = 1 + \frac{b}{a} t_s \tag{9}$$

The described set-up can be used for routine measurement of filter curves. The simplicity of the optical part is shown in FIG. 2. Light from the exit slit of monochromator 40 is focused by a lens 42 on the photodetector 28. A small part 44 of the beam is chopped with the sample 46 located directly behind the chopper 48. Sample 46 is held by a suitable sample holder 47.

The specific apparatus shown and described which embodies the invention is intended as an example only, it being understood that alternatives are possible which are within the scope of the invention. For example, while the chopper is shown as a mechanical chopper, one may employ instead an electronic chopper which includes a light sensor and means for electronically interrupting the output of the sensor. This may be accomplished by placing an electronic switch, such as a transistor switch circuit, in the output current path of the sensor and turning the switch on and off by a square wave.

What is claimed is:

1. An apparatus for determining the ratio of two signals each at a continuous amplitude level comprising:
   means for chopping one of said signals;
   means for combining the chopped one signal and the other signal to generate a composite signal;
   means for logarithmically amplifying said composite signal to produce an output signal having an alternating amplitude level component and a continuous amplitude level component, said alternating amplitude level component being a function of the ratio of said two signals; and
   means for producing an output manifesting the amplitude of the alternating amplitude level component of said output signal.

2. The apparatus of claim 1 wherein said means for producing includes a filter receptive of said output signal for passing only said alternating amplitude level component, and amplifier means for amplifying said passed alternating amplitude level component.

3. The apparatus of claim 2 wherein said means for detecting includes anti-logarithm amplifying means responsive to said passed amplified alternating amplitude level component for generating a signal whose amplitude is the anti-logarithm of said passed alternating amplitude level component.

4. A method for determining the ratio between two signals each of a continuous amplitude level comprising:
   translating one of said signals to an alternating amplitude level signal of an amplitude proportional to the magnitude of said one signal;
   combining the alternating amplitude level signal with the other signal to form a composite signal;
   logarithmically amplifying said composite signal; and
   producing an output indicative of the amplitude of the alternating amplitude level component of the amplified composite.

5. Apparatus for determining the radiation transmittance of an element comprising:
   means for passing said radiation through the element;
   means for translating the passed radiation to an AC signal of an amplitude proportional to the intensity of the passed radiation;
   means for producing a DC signal indicative of the intensity of the radiation incident on said element;
   means for detecting said AC and DC signals for producing an output current indicative of the sum of the intensities of said two signals;
   means for logarithmically amplifying said output current; and
   means for producing an output indicative of the amplitude of the AC component of said amplified output current.

6. The apparatus of claim 5 wherein said means for producing an output includes means for anti-logarithmically amplifying said AC component amplitude.

7. An optical spectrometer comprising:
   beam splitter means for receiving a beam of light and forming said received beam into first and second beams,
   beam interrupting means for cyclically interrupting one of said first and second beams,
   photo-detecting means positioned to receive said interrupted one and the other of said beams for generating an output signal representing the combined intensities of said one and other beams,
   logarithm amplifier means for logarithmically amplifying said output signal, and
   detecting means for detecting the amplitude of the AC component of said logarithmically amplified signal.

8. The spectrometer of claim 7 wherein said detecting means includes DC filtering means for passing only said AC component, and amplifying means for amplifying said passed AC component.

9. The spectrometer of claim 7 further including sample holding means positioned to place a sample to be analyzed in the path of said one beam.

* * * * *